US012804707B2

(12) United States Patent
Zhao et al.

(10) Patent No.: US 12,804,707 B2
(45) Date of Patent: Nov. 17, 2026

(54) INFORMATION RECEIVING AND SENDING METHODS, TERMINAL, AND NETWORK DEVICE

(71) Applicant: DATANG MOBILE COMMUNICATIONS EQUIPMENT CO., LTD., Beijing (CN)

(72) Inventors: Yali Zhao, Beijing (CN); Li Chen, Beijing (CN); Erlin Zeng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 526 days.

(21) Appl. No.: 17/627,608

(22) PCT Filed: Jul. 20, 2020

(86) PCT No.: PCT/CN2020/103100
§ 371 (c)(1),
(2) Date: Jan. 14, 2022

(87) PCT Pub. No.: WO2021/017928
PCT Pub. Date: Feb. 4, 2021

(65) Prior Publication Data

US 2022/0295542 A1 Sep. 15, 2022

(30) Foreign Application Priority Data

Jul. 29, 2019 (CN) ........................ 201910690618.8

(51) Int. Cl.
*H04W 74/00* (2009.01)
*H04W 74/0833* (2024.01)
(Continued)

(52) U.S. Cl.
CPC ..... *H04W 74/006* (2013.01); *H04W 74/0833* (2013.01); *H04W 74/0836* (2024.01); *H04W 76/19* (2018.02)

(58) Field of Classification Search
CPC ............... H04W 74/006; H04W 76/19; H04W 74/0833
See application file for complete search history.

(56) References Cited

U.S. PATENT DOCUMENTS

2017/0223755 A1 8/2017 Lin et al.
2018/0077722 A1* 3/2018 Awad ................ H04W 72/0446
(Continued)

FOREIGN PATENT DOCUMENTS

CN 101370164 A 2/2009
CN 106171037 A 11/2016
(Continued)

OTHER PUBLICATIONS

International Search Report for PCT application PCT/CN2020/103100, issued on Oct. 12, 2020, and its English Translation provided by WIPO.
(Continued)

*Primary Examiner* — Siming Liu
(74) *Attorney, Agent, or Firm* — Ladas & Parry, LLP

(57) ABSTRACT

Information receiving method, information sending method, a terminal and a network device are provided. The disclosure relate to the field of communication technology. The information receiving method is applied to a terminal, and includes receiving a random-access success response message, sent by a network device, of a two-step random access, wherein the random-access success response message includes indication information indicating whether a signaling radio bearer SRB is carried.

8 Claims, 9 Drawing Sheets

(51) Int. Cl.
*H04W 74/0836* (2024.01)
*H04W 76/19* (2018.01)

(56) References Cited

U.S. PATENT DOCUMENTS

| | | | | |
|---|---|---|---|---|
| 2018/0139778 | A1 | 5/2018 | Chou | |
| 2018/0359784 | A1* | 12/2018 | Agiwal | H04W 72/0446 |
| 2019/0207737 | A1 | 7/2019 | Babaei et al. | |
| 2020/0077444 | A1 | 3/2020 | Liu et al. | |
| 2022/0104275 | A1* | 3/2022 | Bao | H04W 74/0833 |

FOREIGN PATENT DOCUMENTS

| | | | | |
|---|---|---|---|---|
| CN | 109661803 A | 4/2019 | | |
| EP | 3466036 A1 | 4/2019 | | |
| EP | 3466036 B1 * | 8/2021 | | H04B 7/00 |
| WO | 2016061785 A1 | 4/2016 | | |
| WO | 2019029251 A1 | 2/2019 | | |

OTHER PUBLICATIONS

Written Opinion PCT application PCT/CN2020/103100, issued on Oct. 12, 2020, and its English Translation provided by WIPO.
International Preliminary Report on Patentability for PCT application PCT/CN2020/103100, issued on Feb. 1, 2022.
"MAC RAR PDU," 3GPP TSG-RAN WG2 #99bis, R2-1710292, Prague, Czech Republic, Oct. 9-13, 2017, Source: CATT, Agenda Item: 10.3.1.3.
"Procedures and mgsB content [105bis#30][NR/2-step RACH]," 3GPP TSG-WG2 Meeting #106, R2-1906308, Reno, USA, May 13-17, 2019, Source: Email Discussion Rapporteur (ZTE), Agenda item: 11.13.x.
"LS on overall procerudre for 2-step RACH," 3GPP TSG RAN WG2#106, R2-1908481, Reno, Nevada, USA , May 13-17, 2019.
First Office Action and search report for Chinese Patent Application 201910690618.8 issued on Nov. 29, 2021 and its English Translation provided by Global Dossier.
First Office Action for Japanese Patent Application No. 2022-506316 issued on Mar. 7, 2023, and its English translation provided by the foreign associate, all pages.
Extended European Search Report for European Patent Application 20847736.4 issued on Sep. 8, 2022 by the European Patent Office.
"General 2-Step RACH procedure," 3GPP TSG-RAN WG2 Meeting #106, R2-1906555 (Revision of R2-1903729), Reno, USA, May 13-May 17, 2019, Agenda Item: 11.13.2 (NR_2step_RACH-Core) Source: LG Electronics Inc., all pages.
"Contention resolution and SRB/DRB delivery for 2-step RACH," 3GPP TSG-RAN WG2 Meeting #106, R2-1906746, Reno, USA, May 13-May 17, 2019, Agenda Item: 11.13.2 Source: ETRI, all pages.
Office action from corresponding South Korean Patent Application No. 10-2022-7006358 dated Oct. 22, 2024, and its English translation.
Zte et al, R2-1906306, msgB content and format, 3GPP TSG RAN WG2 #106, 3GPP server publication date (May 2, 2019).

* cited by examiner

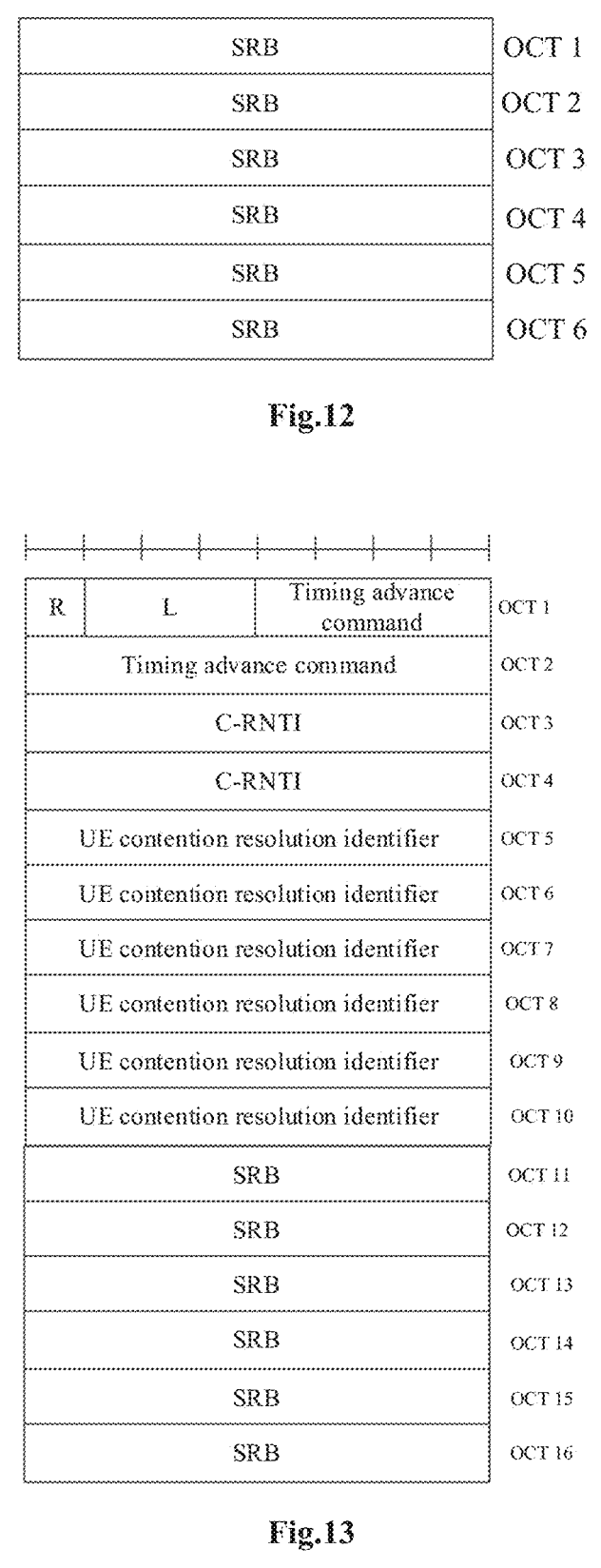

| | |
|---|---|
| SRB | OCT 1 |
| SRB | OCT 2 |
| SRB | OCT 3 |
| SRB | OCT 4 |
| SRB | OCT 5 |
| SRB | OCT 6 |

Fig.12

| | | | |
|---|---|---|---|
| R | L | Timing advance command | OCT 1 |
| Timing advance command | | | OCT 2 |
| C-RNTI | | | OCT 3 |
| C-RNTI | | | OCT 4 |
| UE contention resolution identifier | | | OCT 5 |
| UE contention resolution identifier | | | OCT 6 |
| UE contention resolution identifier | | | OCT 7 |
| UE contention resolution identifier | | | OCT 8 |
| UE contention resolution identifier | | | OCT 9 |
| UE contention resolution identifier | | | OCT 10 |
| SRB | | | OCT 11 |
| SRB | | | OCT 12 |
| SRB | | | OCT 13 |
| SRB | | | OCT 14 |
| SRB | | | OCT 15 |
| SRB | | | OCT 16 |

Fig.13

INFORMATION RECEIVING AND SENDING METHODS, TERMINAL, AND NETWORK DEVICE

CROSS-REFERENCE TO RELATED APPLICATIONS

This application is the U.S. national phase of PCT Application No. PCT/CN2020/103100 filed on Jul. 20, 2020, which claims a priority to Chinese Patent Application No. 201910690618.8 filed in China on Jul. 29, 2019, the disclosures of which are incorporated in their entireties by reference herein.

TECHNICAL FIELD

The present disclosure relates to the field of communication technologies, in particular, relates to an information receiving method, an information sending method, a terminal, and a network device.

BACKGROUND

In a two-step random access procedure, a base station may send multiple types of random access responses to a terminal, such as, a random-access success response (success RAR), a response for fallback to a 4-step random access (fallback RAR).

After the random access succeeds, the terminal and the base station need to perform further communication to establish a radio resource control (RRC) connection. However, there is no clear scheme in the related art for how to apply a random-access success response message to realize an RRC connection.

SUMMARY

Embodiments of the present disclosure provide an information receiving method, an information sending method, a terminal, and a network device, so as to solve the problem in the related art that a terminal cannot determine whether a two-step random-access success response message includes an SRB, and decoding cannot be performed correctly.

In order to solve the above technical problem, some embodiments of the present disclosure provide an information receiving method applied to a terminal. The method includes: receiving a random-access success response message, sent by a network device, of a two-step random access; wherein, the random-access success response message includes indication information for indicating whether a Signaling Radio Bearer (SRB) is carried.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU, wherein when the indication information indicates that there is the SRB subPDU, the random-access success response message further includes the SRB subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU or the indication information is located in a payload of the MAC RAR subPDU, wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or the payload of the MAC RAR subPDU includes a first length indication field; wherein the first length indication field is configured to indicate a length of the MAC RAR subPDU or a length of the SRB in the MAC RAR subPDU.

Further, when the indication information is located in the payload of the MAC RAR subPDU, the payload of the MAC RAR subPDU further includes a second length indication field; wherein the second length indication field is configured to indicate a length of the MAC RAR subPDU or a length of the SRB in the MAC RAR subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU; wherein, when the indication information indicates that there is the SRB subPDU, the random-access success response further includes the SRB subPDU.

Further, when the indication information indicates that there is the SRB subPDU, the MAC subheader of the SRB subPDU further includes a third length indication field; wherein the third length indication field is configured to indicate a length of the SRB subPDU.

Specifically, when the MAC RAR subPDU and the SRB subPDU use a same MAC subheader, the MAC subheader includes at least a part or all of the following fields; an extended field (E field) for indicating whether there are other MAC headers, a T field for indicating a random access preamble identifier or a fallback indication included in the MAC subheader, and random access preamble identifier information; and/or, when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating a logical channel to which the SRB belongs, a L field for indicating a length of the SRB subPDU, an F2 field for indicating a length of the L field, and a reserved bit field.

Specifically, the SRB satisfies at least one of the following: when a message A includes a Radio Resource Control (RRC) connection setup message, the SRB is an RRC setup message or an RRC reject message; when a message A includes an RRC connection re-establishment message, the SRB is an RRC re-establishment message or an RRC reject message; when a message A includes an RRC recovery request message, the SRB is an RRC setup message, an RRC resume message, an RRC release message, an RRC release message with suspend configuration, or an RRC reject message.

Some embodiments of the present disclosure further provide an information sending method applied to a network device. The method includes: sending, to a terminal, a random-access success response message of a two-step random access; wherein, the random-access success response message includes indication information for indicating whether a Signaling Radio Bearer (SRB) is carried.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU, wherein when the indication information indicates that there is the SRB subPDU, the random-access success response message further includes the SRB subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU or the indication information is located in a payload of the MAC RAR subPDU, wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or the payload of the MAC RAR subPDU includes a first length indication field; wherein the first length indication field is configured to indicate a length of the MAC RAR subPDU or a length of the SRB in the MAC RAR subPDU.

Further, when the indication information is located in the payload of the MAC RAR subPDU, the payload of the MAC RAR subPDU further includes a second length indication field; wherein the second length indication field is configured to indicate a length of the MAC RAR subPDU or a length of the SRB in the MAC RAR subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU; wherein, when the indication information indicates that there is the SRB subPDU, the random-access success response further includes the SRB subPDU.

Further, when the indication information indicates that there is the SRB subPDU, the MAC subheader of the SRB subPDU further includes a third length indication field; wherein the third length indication field is configured to indicate a length of the SRB subPDU.

Specifically, when the MAC RAR subPDU and the SRB subPDU use a same MAC subheader, the MAC subheader includes at least a part or all of the following fields: an extended field (E field) for indicating whether there are other MAC headers, a T field for indicating a random access preamble identifier or a fallback indication included in the MAC subheader, and random access preamble identifier information; and/or, when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating a logical channel to which the SRB belongs, a L field for indicating a length of the SRB subPDU, an F2 field for indicating a length of the L field, and a reserved bit field.

Specifically, the SRB satisfies at least one of the following: when a message A includes a Radio Resource Control (RRC) connection setup message, the SRB is an RRC setup message or an RRC reject message; when a message A includes an RRC connection re-establishment message, the SRB is an RRC re-establishment message or an RRC reject message; when a message A includes an RRC recovery request message, the SRB is an RRC setup message, an RRC resume message, an RRC release message, an RRC release message with suspend configuration, or an RRC reject message.

Some embodiments of the present disclosure further provide a terminal. The terminal includes a memory, a processor and a program stored on the memory and executable on the processor, wherein when the processor executes the program, the processor implements the following step: receiving a random-access success response message, sent by a network device, of a two-step random access; wherein, the random-access success response message includes indication information for indicating whether a Signaling Radio Bearer (SRB) is carried.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when random-access success responses for different terminals are not allowed to be multiplexed, the random-access success response message includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU, wherein when the indication information indicates that there is the SRB subPDU, the random-access success response message further includes the SRB subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU or the indication information is located in a payload of the MAC RAR subPDU, wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or the payload of the MAC RAR subPDU includes a first length indication field; wherein the first length indication field is configured to indicate a length of the MAC RAR subPDU or a length of the SRB in the MAC RAR subPDU.

Further, when the indication information is located in the payload of the MAC RAR subPDU, the payload of the MAC RAR subPDU further includes a second length indication field; wherein the second length indication field is configured to indicate a length of the MAC RAR subPDU or a length of the SRB in the MAC RAR subPDU.

Optionally, when random-access success responses for different terminals are allowed to be multiplexed, the random-access success response message includes one or more random-access success responses for one or more terminals, the random-access success response for each terminal includes a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU: wherein, when the indication information indicates that there is the SRB subPDU, the random-access success response further includes the SRB subPDU.

Further, when the indication information indicates that there is the SRB subPDU, the MAC subheader of the SRB subPDU further includes a third length indication field; wherein the third length indication field is configured to indicate a length of the SRB subPDU.

Some embodiments of the present disclosure further provide a network device. The network device includes a memory, a processor and a program stored on the memory and executable on the processor, wherein when the processor executes the program, the processor implements the following step: sending, to a terminal, a random-access success response message of a two-step random access; wherein, the random-access success response message includes indication information for indicating whether a Signaling Radio Bearer (SRB) is carried.

Some embodiments of the present disclosure further provide a readable storage medium having stored thereon a program, wherein, when the program is executed by a processor, the processor implements the above-described information receiving method or the above-described information sending method.

Some embodiments of the present disclosure further provide a terminal. The terminal includes a receiving module, configured to receive a random-access success response message, sent by a network device, of a two-step random access; wherein, the random-access success response message includes indication information for indicating whether a Signaling Radio Bearer (SRB) is carried.

Some embodiments of the present disclosure further provide a network device. The network device includes a sending module, configured to send, to a terminal, a random-access success response message of a two-step random access; wherein, the random-access success response message includes indication information for indicating whether a Signaling Radio Bearer (SRB) is carried.

Beneficial effects of the present disclosure are as follow.

In the above technical solutions, the random-access success response message of the two-step random access includes the indication information for indicating whether the SRB is carried, and the terminal may identify whether the random-access success response message contains the SRB, according to the received random-access success response message, so as to correctly decode a random access response message.

BRIEF DESCRIPTION OF THE DRAWINGS

FIG. 12 shows a schematic diagram of a format of an SRB portion of an SRB subPDU;

FIG. 13 shows a third schematic diagram of the format in which the payload portion of the MAC RAR subPDU carries the SRB;

DETAILED DESCRIPTION

In order to make objectives, technical solutions and advantages of the present disclosure more apparent, the present disclosure will be described in detail with reference to drawings and specific embodiments.

Some of concepts mentioned in some embodiments of the present disclosure are first described as follows.

A random access of Long Term Evolution (LTE) and a conventional random access of a New Radio (NR) are divided into two types: a contention-based random access and a non-contention-based random access, wherein ae procedure of the contention-based random access is as follows.

Figure 1:
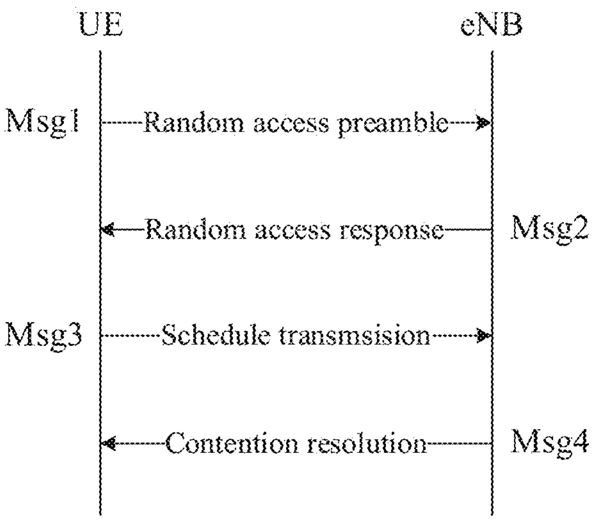
FIG. 1 is a schematic diagram of a contention-based random access procedure in LTE and NR systems.

As shown in FIG. 1, the contention-based random access procedure is divided into four steps, and is called 4-step Random Access (RA):

Message 1 (Msg1): a User Equipment (UE, also referred to as a terminal) selects a preamble for random access and a Physical Random Access Channel, PRACH) resource and transmits, to the base station using the PRACH resource, the selected preamble for random access.

Figure 2:
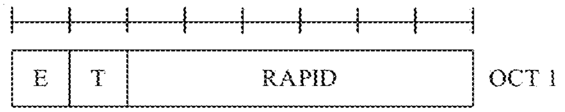
FIG. 2 shows a schematic diagram of a MAC subheader format in an RAR
Figure 3:
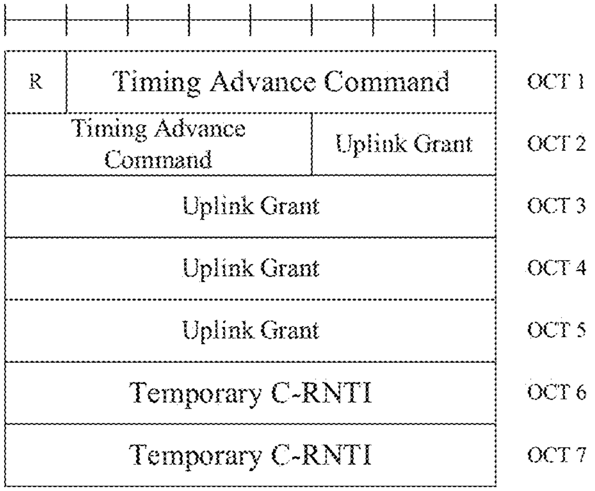
FIG. 3 is a schematic diagram of a MAC RAR format in a random access response.

Message 2 (Msg2): the base station receives the preamble and sends a random access response (RAR). The random access response consists of two parts: a Medium Access Control (MAC) header and a MAC RAR. The MAC header includes a plurality of subheaders, and main contents of the MAC header include a Random Access Preamble ID (RAPID) and a Backoff Indicator (BI). FIG. 2 is a schematic diagram of the MAC subheader with the RAPID. FIG. 3 is a format of the MAC RAR, of the random access response, including a Time Advance Command (TAC), an uplink resource grant (UL Grant) for a Message 3 (Msg3), and a temporary cell Radio Network Temporary Identity (C-RNTI) allocated by a network side. Both a physical downlink control channel (PDCCH) carrying Msg2 scheduling information and a physical downlink shared channel (PDSCH) carrying the Msg2 are scrambled with a RA-RNTI, which uniquely corresponds, within a length of a window for receiving the Msg2 by the UE, to time-frequency resources for sending Msg1. When receiving the Msg2, the UE determines, through the RA-RNTI and the preamble ID, that the Msg2 corresponds to the Msg1 transmitted by the UE.

Msg3: the UE sends uplink transmission on the UL grant designated by Msg2, contents of Msg3 uplink transmission are different for different random access reasons, for example, for initial access, Msg3 transmits a radio resource control (RRC) connection establishment request, what a UE in a connected state sends in Msg3 is a C-RNTI MAC Control Element (CE). In summary, the Msg3 sends a UE-specific identifier for the base station to finally and uniquely determine the UE.

Message 4 (Msg4): a contention resolution message, wherein the UE determines whether the random access is successful according to the Msg4. For a UE in an idle state or in an inactive state, the Msg4 carries a CCCH MAC CE containing a RRC signaling content of the Msg3, and for a UE in the connected state, Msg4 is scheduled by a PDCCH of a unique identifier C-RNTI of the UE within a cell, the PDCCH may enable contention resolution. For a UE in the idle state (idle UE) or a UE in the inactive state (inactive UE), a temporary C-RNTI is converted into a unique UE identifier C-RNTI of the UE in the cell after the contention resolution is successful.

Figure 4:
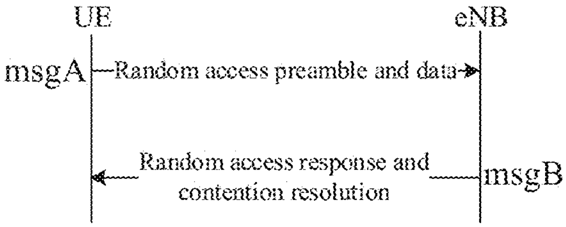
FIG. 4 is a schematic diagram of a two-step random access procedure in a new generation radio network NR system.

In a new generation radio network NR system, a two-step random access procedure (2-step RA) is introduced on the basis of the 4-step RA for contention-based random access, and the procedure is shown in FIG. 4. In the procedure, a msgA is divided into preamble transmission on PRACH and data transmission on a Physical Uplink Shared Channel (PUSCH), and is equivalent to Msg1 plus Msg3 of the 4-step RA; a msgB for random access response and contention resolution is equivalent to Msg2 plus Msg4 in the 4-step random access channel (RACH). Because the msgB contains UE contention resolution information, a size of the msgB is different from the Msg2.

In the two-step random access procedure shown in FIG. 4, the base station may send multiple types of random access responses to the UE, such as: a success Random Access Response (success RAR); a RAR for fallback to the 4-step (fallbackRAR).

For the sucessRAR, in order to further reduce a delay, it may be considered to carry a SRB (for example, RRC connection setup and RRC connection re-establishment messages) in the sucessRAR, but there is still no solution for how to design the sucessRAR.

In view of the above problems, the present disclosure provides an information receiving method, an information sending method, a terminal, and a network device.

Figure 5:
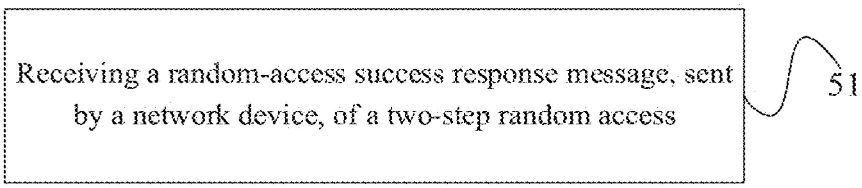
FIG. 5 is a flowchart of an information receiving method according to some embodiments of the present disclosure.

As shown in FIG. 5, the information receiving method according to some embodiments of the present disclosure is applied to a terminal. The method includes a step 51.

Step 51: receiving a random-access success response message, sent by a network device, of a two-step random access.

The random-access success response message includes indication information for indicating whether a signaling radio bearer (SRB) is carried.

It should be noted that, the two-step random access refers to a simplified random access procedure, in the new generation radio network NR system, derived on the basis of the four-step random access, and is used for the contention-based random access.

It should be noted that, a manner of carrying the SRB is to directly carry specific contents of the SRB in a Medium Access Control Random Access Response sub-Protocol Data Unit (MAC RAR subPDU) of the random-access success response message. Another manner of carrying the SRB is that the random-access success response message carries an SRB subPDU, and the SRB subPDU carries the specific contents of the SRB.

When the indication information indicates that the SRB is carried, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message; when the message A includes an RRC recovery request message, the SRB is an RRC setup message, an RRC resume message, an RRC release message, an RRC release message with suspend configuration, or an RRC reject message.

A specific format of the random-access success response message is described hereinafter for a case in which random-access success response messages for different terminals are not allowed to be multiplexed (which means that one random-access success response message is used for one terminal only) and a case in which random-access success response messages for different terminals are allowed to be multiplexed (which means that one random-access success response message is used for at least one terminal).

First, the case in which the random-access success response messages for different terminals are not allowed to be multiplexed.

In this case, the random-access success response message for the two-step random access of one terminal may include only one sub-Protocol Data Unit (subPDU), or the random-access success response message for the two-step random access of one terminal may include two subPDUs, and specific formats of the random-access success response message under the two circumstances are respectively described as follow.

A11. The random-access success response message for the two-step random access of one terminal includes only one subPDU.

Under this circumstance, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

It should be noted that since the MAC RAR subPDU includes a MAC subheader and a payload portion (also referred to as a payload), the indication information may be placed in either the MAC subheader or the payload portion.

It should be further noted that, when the indication information is located in the MAC subheader of the MAC RAR subPDU, the MAC subheader of the MAC RAR subPDU includes a first length indication field, or, the payload portion of the MAC RAR subPDU includes a first length indication field; wherein the first length indication field is configured to indicate a length of the MAC RAR subPDU or a length of the SRB in the MAC RAR subPDU.

It should be further noted that, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

It should be noted that, by carrying a length indication field in the MAC RAR subPDU, the length indication field is configured to indicate the length of the MAC RAR subPDU or the length of the SRB, so that the terminal can correctly parse the SRB.

Specific applications under this circumstance is illustrated below.

The random-access success response message for the two-step random access includes only one MAC RAR subPDU corresponding to the random-access success response message, and a specific format of the MAC RAR subPDU can be designed in the following two ways:

A first way: indication information for indicating whether the random-access success response message carries an SRB is added to the MAC subheader of the MAC RAR subPDU corresponding to the random-access success response message.

Figure 6:
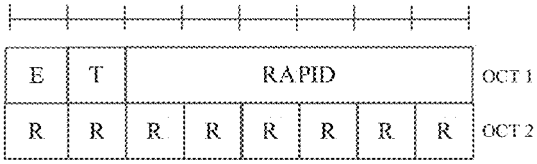
FIG. 6 is a schematic diagram showing a MAC subheader format of a MAC RAR subPDU.

A format of the MAC subheader of the MAC RAR subPDU corresponding to the random-access success response message of the two-step random access is illustrated in FIG. 6. One R bit is used to indicate whether the random-access success response message carries an SRB. For example, if a value of the R bit is 1, then it means that the SRB is carried, and if the value of the R bit is 0, then it means that no SRB is carried. Of course, if the random success response message of the two-step random access does not need to carry the PRAPID, an existing RAPID part may also be used to indicate whether the SRB is carried.

The payload portion in the MAC RAR subPDU corresponding to the random-access success response message of the two-step random access includes at least the following:

N11, Timing Advance Command;

N12, Cell Radio Network Temporary Identity (C-RNTI);

N13, UE contention resolution identifier;

Optionally, the payload portion may also carry an SRB. Whether the SRB is carried depends on the indication information in the MAC subheader of the MAC RAR subPDU, and if it indicates that carrying the SRB is needed, the SRB is carried; otherwise, the SRB is not carried.

Figure 7:
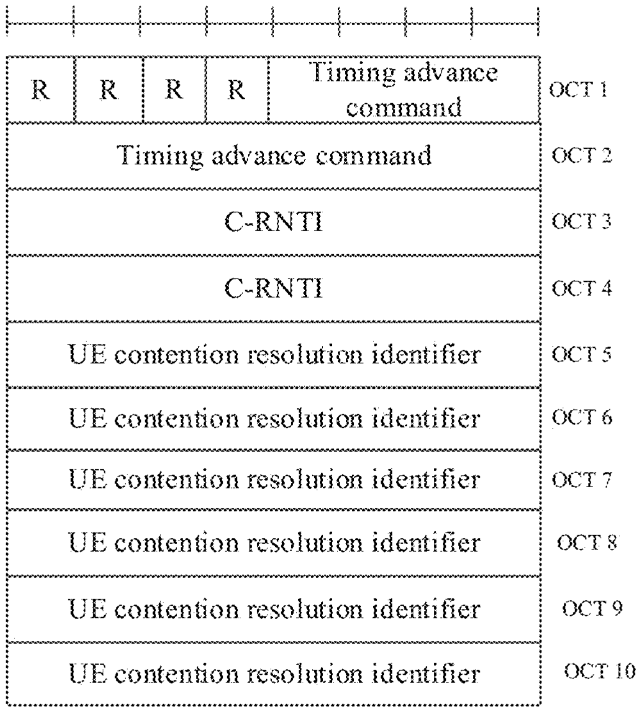
FIG. 7 is a first schematic diagram showing a format in which a payload portion of a MAC RAR subPDU does not carry an SRB.

If the payload portion does not carry the SRB, a possible format of the payload portion is shown in FIG. 7, where R bits are added to fill up the entire byte.

Figure 8:
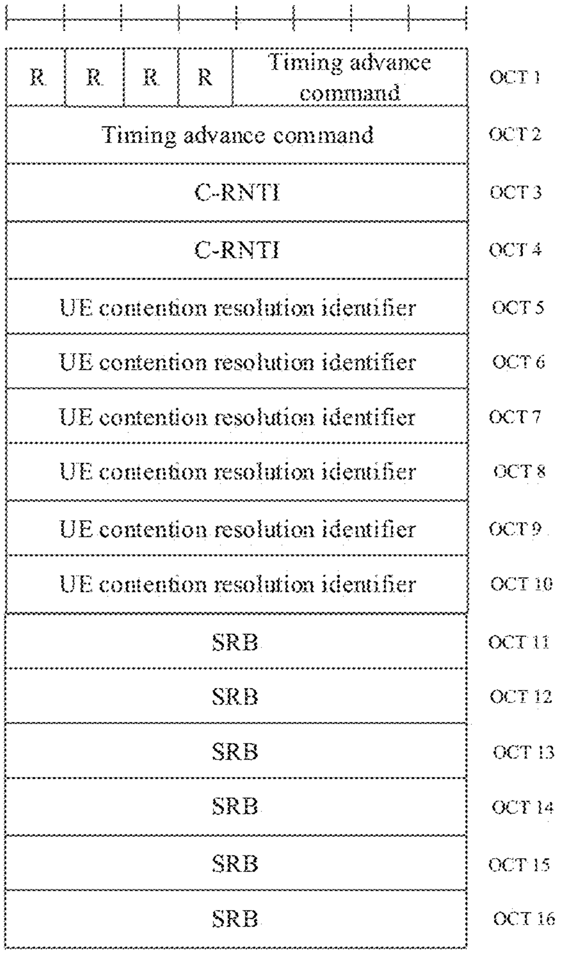
FIG. 8 is a first schematic diagram showing a format in which a payload portion of a MAC RAR subPDU carries an SRB.

If the payload portion carries the SRB and the length of the SRB is fixed, then the length of the payload portion is also fixed; otherwise, the length of the payload portion is variable, a specific value of the length is related to the length of the SRB to be carried. For example, if the length of the SRB is fixed to 48 bits, the format of the payload portion is shown in FIG. 8.

A second way: indication information for indicating whether the random-access success response message carries the SRB is added to the payload portion of the MAC RAR subPDU corresponding to the random-access success response message.

A format of the MAC subheader of the MAC RAR subPDU corresponding to the random-access success response message of the two-step random access is consistent with a format of the MAC subheader of the MAC RAR subPDU in an existing protocol, as shown in FIG. 2.

Figure 9:
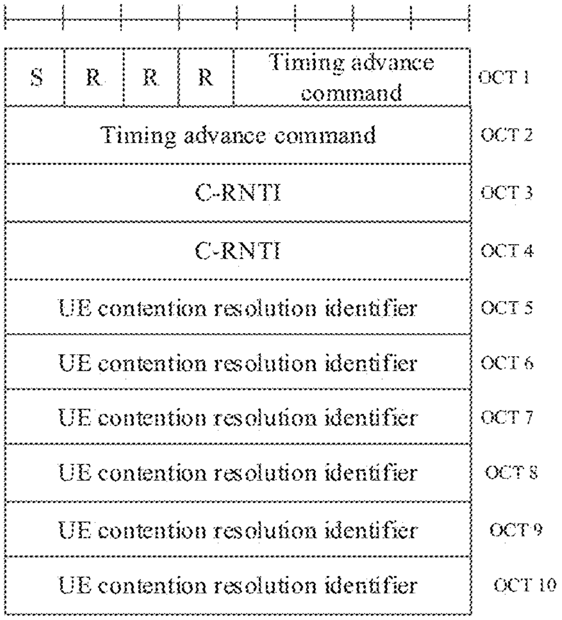
FIG. 9 shows a second schematic diagram of the format in which the payload portion of the MAC RAR subPDU does not carry the SRB.
Figure 10:
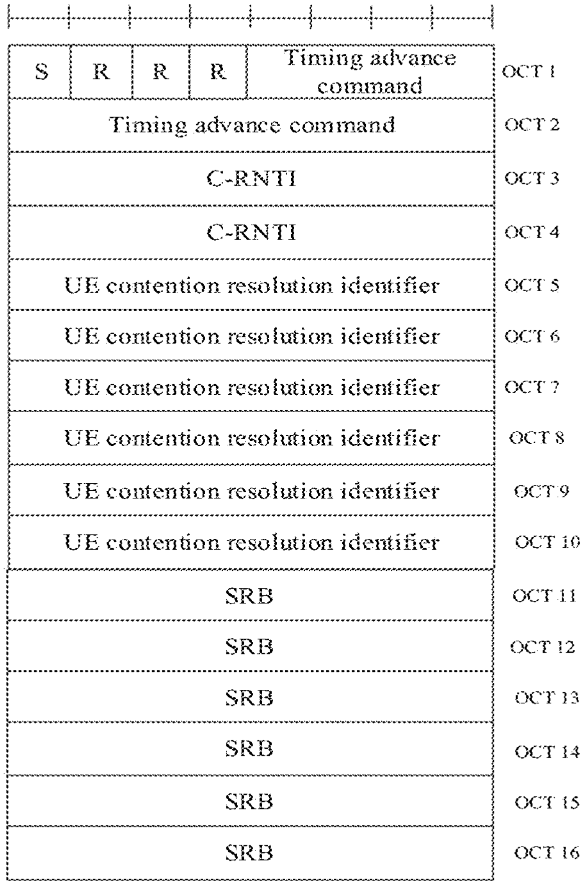
FIG. 10 shows a second schematic diagram of the format in which the payload portion of a MAC RAR subPDU carries the SRB.

The payload portion of the MAC RAR subPDU of a two-step random access response includes at least the following:

N21, indication information for indicating whether the SRB is carried;

N22, Timing Advance Command;

N23, C-RNTI;

N24, UE contention resolution identifier;

The indication information for indicating whether the SRB is required to be carried may be indicated by one bit in the payload portion, such as S indication information in FIG. 9 and FIG. 10. If it indicates that the SRB is required to be carried, then the RAR also needs to carry the SRB.

If the payload portion does not carry the SRB, then the format of the payload portion is shown in FIG. 9, wherein R bits are added to fill up the entire byte, wherein an S field may be set to 0 which indicates that the payload portion does not need to carry the SRB.

If the payload portion carries the SRB and the length of the SRB is fixed, then the length of the payload portion is also fixed; otherwise, the length of the payload portion is variable, a specific value of the length is related to the length of the SRB to be carried. For example, the length of the SRB is fixed to 48 bits, and the format of the payload portion is shown in FIG. 10, wherein an S field may be set to 1 which indicates that the payload portion needs to carry the SRB.

A12. Two subPDUs are configured for the random-access success response message of the two-step random access of one terminal.

In this case, the random-access success response message includes a MAC RAR subPDU, the indication information is located in a MAC subheader of the MAC RAR subPDU, and the indication information is configured to indicate whether there is an SRB subPDU; wherein, when the indication information indicates that there is an SRB subPDU, the random-access success response message further includes an SRB subPDU.

It should be noted that in this case, the MAC subheader of the MAC RAR subPDU includes indication information for indicating whether there is the SRB subPDU, and if the indication information indicates that there is the SRB subPDU, then the random-access success response message should further include the SRB subPDU, and if the indication information indicates that there is no SRB subPDU, then the random-access success response message does not include the SRB subPDU.

Further, when the indication information indicates that there is an SRB subPDU, the MAC subheader of the SRB subPDU further includes a third length indication field; wherein the third length indication field is configured to indicate the length of the SRB subPDU.

It should be noted that, when the length of the SRB is not fixed, the MAC subheader should include a length indication field for indicating the length of the SRB subPDU, in order for the terminal to correctly parse the SRB.

It should be noted that the MAC RAR subPDU and the SRB subPDU may use MAC subheaders having the same or different formats.

In particular, when the MAC RAR subPDU and the SRB subPDU use the MAC subheaders having the same format, the MAC subheader includes at least a part or all of the following fields: an extended field (E field) for indicating whether there are other MAC headers, a T field for indicating a random access preamble identifier or a fallback indication included in the MAC subheader, and random-access preamble identifier information; and/or when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes a part or all of the following fields: an extended field (E field) for indicating whether there are other MAC headers, a logical channel ID (LCID field) for indicating a logical channel to which the SRB belongs, an L field for indicating the length of the SRB subPDU, an F2 field for indicating an length of the L field, and a reserved bit field.

A specific application scenario in this case is illustrated below.

The random-access success response message of one terminal is designed as two subPDUs, i.e., a MAC RAR subPDU and an SRB subPDU, wherein the MAC RAR subPDU must appear, and whether the SRB subPDU appears or not is optional and can be indicated by an E bit in the MAC subheader corresponding to a first subPDU.

Figure 11:
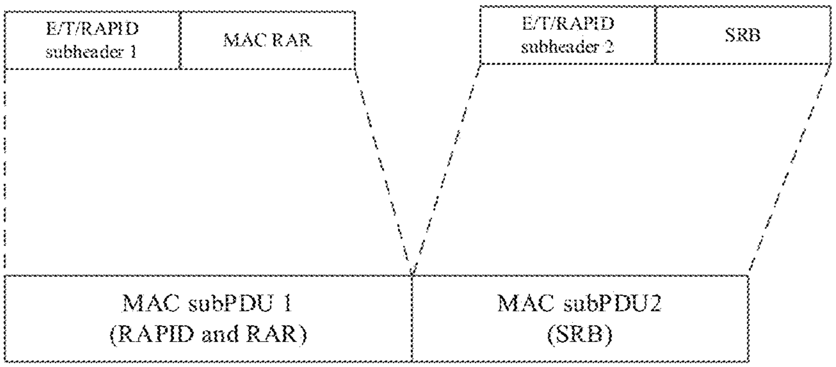
FIG. 11 shows a first schematic diagram of a format of a random-access success response message.

A specific format of the random-access success response message is shown in FIG. 11, which is composed of two subPDUs, the first of which is a MAC RAR subPDU, and the second of which is an SRB subPDU.

Formats of the MAC subheader and the payload portion of the MAC RAR subPDU are shown in FIG. 2 and FIG. 7, respectively. Formats of the MAC subheader and the SRB portion of the SRB subPDU are shown in FIG. 2 and FIG. 12, respectively. If the length of the SRB is fixed, then the length of the SRB subPDU is also fixed, and if the length of the SRB is variable, then the length of the SRB subPDU is also variable. In FIG. 12, an example in which the length of the SRB is 48 bits is described.

Second, the case in which the random-access success response messages for different terminals are allowed to be multiplexed.

In this case, the random-access success response for the two-step random access of one terminal may include only one sub-Protocol-Data-Unit (subPDU), or the random-access success response for the two-step random access of one terminal may include two subPDUs, and specific formats of the random-access success response messages under the two circumstances are respectively described as follow.

B11. The random-access success response message for the two-step random access of one terminal includes one subPDU.

Under this circumstance, the random-access success response message includes random-access success responses for one or more terminals. For each terminal, the random-access success response includes a Medium Access Control Random Access Response sub-Protocol-Data-Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

It should be noted that since the MAC RAR subPDU for one terminal includes a MAC subheader and a payload portion, the indication information may be placed in either the MAC subheader or the payload portion.

It should be further noted that, different places where the indication information is arranged may affect formats of random-access success responses. The formats of the random-access success responses in cases where the indication information is arranged at different places are described in details hereinafter.

B111. The indication information is located at the MAC header of the MAC RAR subPDU.

The MAC subheader of the MAC RAR subPDU includes a first length indication field, or, the payload portion of the MAC RAR subPDU includes a first length indication field; wherein the first length indication field is configured to indicate a length of the MAC RAR subPDU or a length of the SRB in the MAC RAR subPDU.

It should be noted that, when the length of the SRB is not fixed, the MAC RAR subPDU should include a length indication field for indicating the length of the MAC RAR subPDU or the length of the SRB, in order to enable the terminal to correctly parse the SRB.

B112. The indication information is located in the payload of the MAC RAR subPDU.

The payload of the MAC RAR subPDU further includes a second length indication field; wherein the second length indication field is configured to indicate the length of the MAC RAR subPDU or the length of the SRB in the MAC RAR subPDU.

It should be noted that, when the length of the SRB is not fixed, the payload portion should include a length indication field for indicating the length of the MAC RAR subPDU or the length of the SRB, in order to enable the terminal to correctly parse the SRB.

Specific application scenarios under this circumstance are illustrated below.

MAC RAR subPDUs for random access of different terminals are allowed to be multiplexed into one MAC PDU. A random access response of two-step random access of any of the terminals may be designed as one subPDU which can be designed specifically in the following two ways.

A first way: indication information for indicating whether the random-access success response message carries an SRB is added to the MAC subheader of the MAC RAR subPDU corresponding to the random-access success response message. Further, if the length of the SRB is variable, a length indication field L configured to indicate the length of the MAC RAR subPDU or the length of the SRB portion in the MAC RAR subPDU needs to be added in the MAC subheader of the MAC RAR subPDU; or a length indication field L configured to indicate the length of the MAC RAR subPDU or the length of the SRB portion in the MAC RAR subPDU needs to be added in the payload portion of the MAC RAR subPDU.

The format of the MAC subheader of the MAC RAR subPDU corresponding to the random-access success response of the two-step random access of one terminal is shown in FIG. 6. One R bit is used to indicate whether the random-access success response carries an SRB. For example, if the value of the R bit is 1, then it means that the SRB is carried, and if the value of the R bit is 0, then it means that no SRB is carried. Further, if the length of the SRB is variable, then the length indication field L may be further added in the MAC subheader of the MAC RAR subPDU, for example, remaining R bits are used as the length indication field for indicating the length of the MAC RAR subPDU or the length of the SRB portion in the MAC RAR subPDU.

The payload portion corresponding to the two-step random access response includes at least the following:

M11, Timing Advance Command;

M12, C-RNTI;

M13, UE contention resolution identifier;

Optionally, the payload portion may also carry an SRB. Whether the SRB is carried depends on the indication information in the MAC subheader of the MAC RAR subPDU, and if it indicates that carrying the SRB is needed, the SRB is carried, otherwise, the SRB is not carried.

If the MAC subheader of the MAC RAR subPDU carries indication information for indicating the length of the payload portion in the MAC RAR subPDU or indicating the length of the SRB portion in the MAC RAR subPDU, then the payload portion of the MAC RAR subPDU no longer needs to carry the indication information for indicating the length of the payload portion in the MAC RAR subPDU or indicating the length of the SRB portion in the MAC RAR subPDU. Otherwise, if the MAC RAR subPDU is not the last subPDU in a MAC PDU, then the payload portion of the MAC RAR subPDU needs to carry length indication information for indicating the length of the MAC RAR subPDU or the length of the SRB portion in the MAC RAR subPDU.

The format of the payload portion of the MAC RAR subPDU is shown in FIG. 7, by taking, as an example, a case that the payload portion of the MAC RAR subPDU does not contain the length indication information for indicating the length of the MAC RAR subPDU or the length of the SRB portion in the MAC RAR subPDU.

If the RAR carries the SRB and the length of the SRB is fixed, then the length of the payload portion is also fixed; otherwise, the length of the payload portion is variable, and a specific value of the length is related to the length of the SRB to be carried. Taking, as an example, a case that the length of the length of the SRB is 48 bits, then the format of the RAR is shown in FIG. 8.

A second way: indication information for indicating whether the random-access success response message carries the SRB is added to the payload portion of the MAC RAR subPDU corresponding to the random-access success response message. Further, if the length of the SRB is variable, it is also necessary to add a length indication field L to the payload portion of the MAC RAR subPDU, the length indication field L is used for indicating the length of the MAC RAR subPDU or the length of the SRB portion in the MAC RAR subPDU.

A format of the MAC subheader of the MAC RAR subPDU corresponding to the random-access success response message of the two-step random access of one terminal is consistent with a format of the MAC subheader of the MAC RAR subPDU in an existing protocol, as shown in FIG. 2.

The payload portion of the MAC RAR subPDU of the two-step random access response includes at least the following:

N21, indication information for indicating whether the SRB is carried;

N22, Timing Advance Command;

N23, C-RNTI;

N24, UE contention resolution identifier.

If the indication information of whether to carry the SRB indicates that the SRB needs to be carried, the payload portion of the MAC RAR subPDU needs to carry the SRB.

If the payload portion of the MAC RAR subPDU does not carry an SRB, then a possible format is shown in FIG. 7, where R bits are added to fill up the entire byte. One of the R bits is used to indicate whether an SRB is carried in the RAR. For example, if the R bit is set to 0, then it means that the RAR may not carry the SRB, otherwise, it needs to carry the SRB.

If the payload portion of the MAC RAR subPDU does not carry an SRB and the length of the SRB is fixed, then the length of the payload portion is also fixed; otherwise, the length of the payload portion is variable, and the specific value of the length is related to the length of the SRB to be carried. If the length of the SRB is variable, then the payload portion of the MAC RAR subPDU also needs to carry length indication information for indicating the length of the payload portion of the MAC RAR subPDU or the length of the SRB portion in the MAC RAR subPDU. Taking, as an example, a case that the L field occupies 3 bits and the length of the SRB is 48 bits, then the format of the RAR is shown in FIG. 13.

B12. The random-access success response message for the two-step random access of one terminal includes two subPDUs.

Under this circumstance, the random-access success response message includes random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, the indication information is an indication field configured to indicate whether there is an SRB subPDU.

When the indication information indicates that there is the SRB subPDU, the random-access success response further includes an SRB subPDU.

Further, when the indication information indicates that there is the SRB subPDU, the MAC subheader of the SRB subPDU further includes a third length indication field; wherein the third length indication field is configured to indicate the length of the SRB subPDU.

It should be noted that, when the length of the SRB is not fixed, the MAC subheader should include a length indication field for indicating the length of the SRB subPDU, in order to enable the terminal to correctly parse the SRB.

It should be noted that the MAC RAR subPDU and the SRB subPDU may use MAC subheaders having the same or different formats.

Further, when the MAC RAR subPDU and the SRB subPDU use the MAC subheader having the same format, the MAC subheader includes an E field, a T field and random-access preamble identifier information.

When the MAC RAR subPDU and the SRB subPDU use MAC subheaders having different formats, the MAC subheader of the SRB subPDU includes following.

A specific application scenario in this case is illustrated below.

The random-access success response of one terminal is designed as two subPDUs, i.e., the MAC RAR subPDU and the SRB subPDU, wherein the MAC RAR subPDU must appear, and whether the SRB subPDU appears or not is optional, which can be indicated by the E bit in the MAC subheader corresponding to the first subPDU. The E field in the MAC subheader corresponding to the MAC RAR subPDU indicates whether the SRB subPDU exists or not, and using the same MAC subheader for two subPDUs shows that the two subPDUs are related. If the length of the second subPDU is variable, a length indication field is added to the subheader of the second subPDU or to the subPDU itself.

Figure 14:
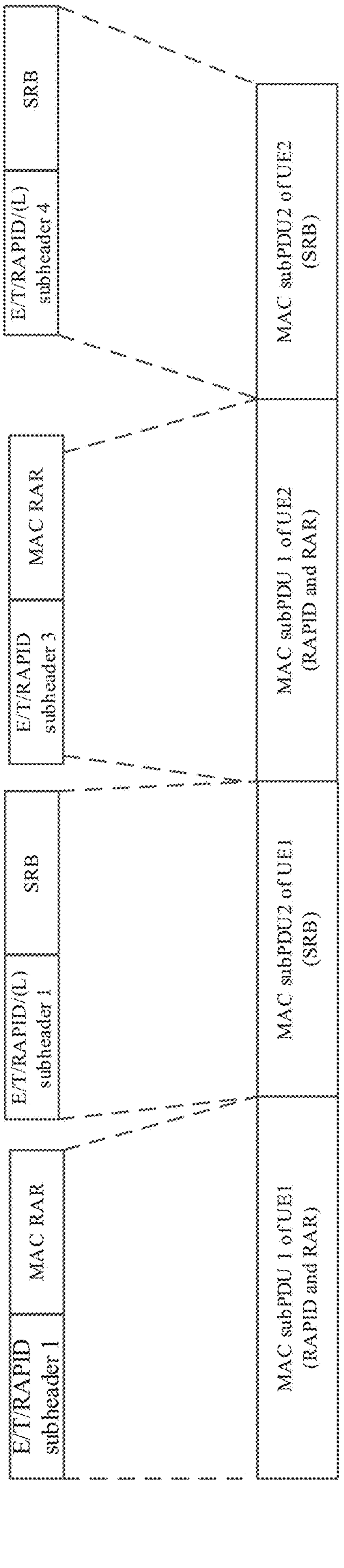
FIG. 14 shows a second schematic diagram of the format of the random-access success response message.

The specific format of the random-access success response message is shown in FIG. 14.

Formats of the MAC subheader and the RAR of the MAC RAR subPDU are shown in FIG. 2 and FIG. 7, respectively.

If the length of the SRB is fixed, then the MAC subheader and a SubPDU format of the SRB subPDU corresponding to the SRB are shown in FIG. 2 and FIG. 12, and the length indication field (the case of 48 bits is taken as an example in FIG. 12) is not required.

Figure 15:
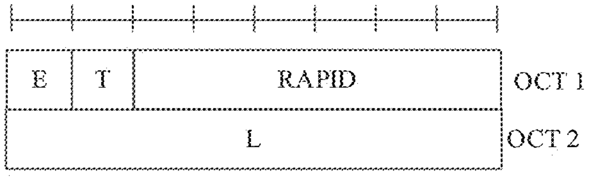
FIG. 15 shows a schematic diagram of a format of a MAC subheader of an SRB subPDU.

If the length of the SRB is variable, then the MAC subheader and the subPDU format of the SRB subPDU corresponding to the SRB are shown in FIG. 15 and FIG. 12. FIG. 15 shows an example in which a length indication field is required (a case that the length of the L field is 1 byte is illustrated in FIG. 15) and the length indication field is added to the MAC subheader.

It should be noted that some embodiments of the present disclosure may flexibly indicate whether the random-access success response message carries the SRB, and the terminal may, according to the received random-access success response message, identify whether the random-access success response message includes the SRB, so as to correctly decode the random access response message.

Figure 16:
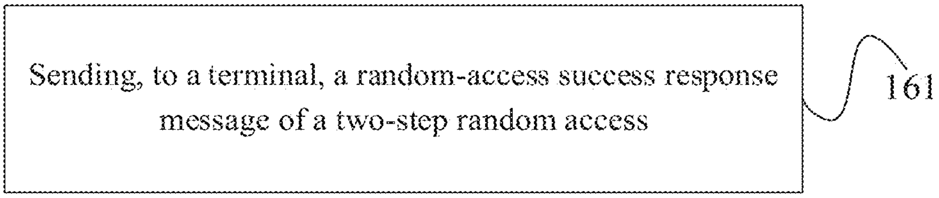
FIG. 16 shows a flowchart of an information sending method according to some embodiments of the present disclosure.

As shown in FIG. 16, the information sending method according to some embodiments of the present disclosure is applied to a network device. The information sending method includes a step 161.

Step 161: sending, to a terminal, a random-access success response message of a two-step random access.

The random-access success response message includes indication information for indicating whether a signaling radio bearer (SRB) is carried.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, and the indication information is configured to indicate whether there is the SRB subPDU; wherein, when the indication information indicates that there is the SRB subPDU, the random-access success response message further includes the SRB subPDU.

Optionally, when the random-access success response messages for different terminals are allowed to be multiplexed, the random-access success response message includes random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or a payload portion of the MAC RAR subPDU includes a first length indication field; wherein the first length indication field is configured to indicate the length of the MAC RAR subPDU or the length of the SRB in the MAC RAR subPDU.

Further, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), and the indication information is located in the MAC subheader of the MAC RAR subPDU, the indication information is configured to indicate whether there is an SRB subPDU; wherein, when the indication information indicates that there is an SRB subPDU, the random-access success response further includes an SRB subPDU.

Further, when the indication information indicates that there is an SRB subPDU, the MAC subheader of the SRB subPDU further includes a third length indication field; wherein the third length indication field is configured to indicate the length of the SRB subPDU.

In particular, when the MAC RAR subPDU and the SRB subPDU use the same MAC subheader, the MAC subheader includes at least a part or all of the following fields: an extended field (E field) for indicating whether there are other MAC headers, a T field for indicating a random access preamble identifier or a fallback indication included in the MAC subheader, and random-access preamble identifier information; and/or when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating the logical channel to which the SRB belongs, a length indication field (L field) for the length of the SRB subPDU, an F2 field for indicating the length of the L field, and a reserved bit field.

Specifically, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message; when the message A includes an RRC recovery request message, the SRB is an RRC setup message, an RRC resume message, an RRC release message, an RRC release message with suspend configuration, or an RRC reject message.

It should be noted that all the descriptions about the network device in the above embodiments are applicable to the embodiments of the information sending method, and the same technical effects can be achieved.

Figure 17:
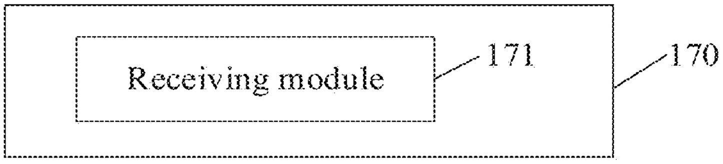
FIG. 17 shows a block diagram of a terminal according to some embodiments of the present disclosure.

As shown in FIG. 17, some embodiments of the present disclosure provide a terminal 170. The terminal 170 includes a receiving module 171.

The receiving module 171 is configured for receiving a random-access success response message, sent by a network device, of a two-step random access; wherein, the random-access success response message includes indication information for indicating whether a signaling radio bearer (SRB) is carried.

Optionally, when random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when the random-access success response messages for different terminals are not allowed to be multiplexed, the random-access success response includes a Medium Access Control Random Access Response sub-Protocol-Data-Unit (MAC RAR subPDU), the indication information is located in the MAC subheader of the MAC RAR subPDU, the indication information is configured to indicate whether there is an SRB subPDU, wherein when the indication information indicates that there is a SRB subPDU, the random-access success response message further includes the SRB subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU or the indication information is located in the payload of the MAC RAR subPDU, wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or the payload portion of the MAC RAR subPDU includes a first length indication field; wherein the first length indication field is configured to indicate the length of the MAC RAR subPDU or the length of the SRB in the MAC RAR subPDU.

Further, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, the indication information is configured to indicate whether there is an SRB subPDU.

When the indication information indicates that there is the SRB subPDU, the random-access success response further includes the SRB subPDU.

Further, when the indication information indicates that there is the SRB subPDU, the MAC subheader of the SRB subPDU further includes a third length indication field; wherein the third length indication field is configured to indicate the length of the SRB subPDU.

In particular, when the MAC RAR subPDU and the SRB subPDU use the same MAC subheader, the MAC subheader includes at least a part or all of the following fields: an extended field (E field) for indicating whether there are other MAC headers, a T field for indicating a random access preamble identifier or a fallback indication included in the MAC subheader, and random access preamble identifier information; and/or when the MAC RAR subPDU and the SRB subPDU use MAC subheaders having different formats, the MAC subheader of the MAC RAR subPDU includes a part or all of the following fields; an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating the logical channel to which the SRB belongs, an L field for indicating the length of the SRB subPDU, an F2 field for indicating the length of the L field, and a reserved bit field.

Specifically, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message, when the message A includes an RRC recovery request message, the SRB is an RRC setup message, an RRC resume message, an RRC release message, an RRC release message with suspend configuration, or an RRC reject message.

It should be noted that, the embodiment of the terminal is a terminal corresponding to the embodiment of the method, and all the implementations in the embodiment of the method are applicable to the embodiment of the terminal, and the same technical effect can be achieved.

Figure 18:
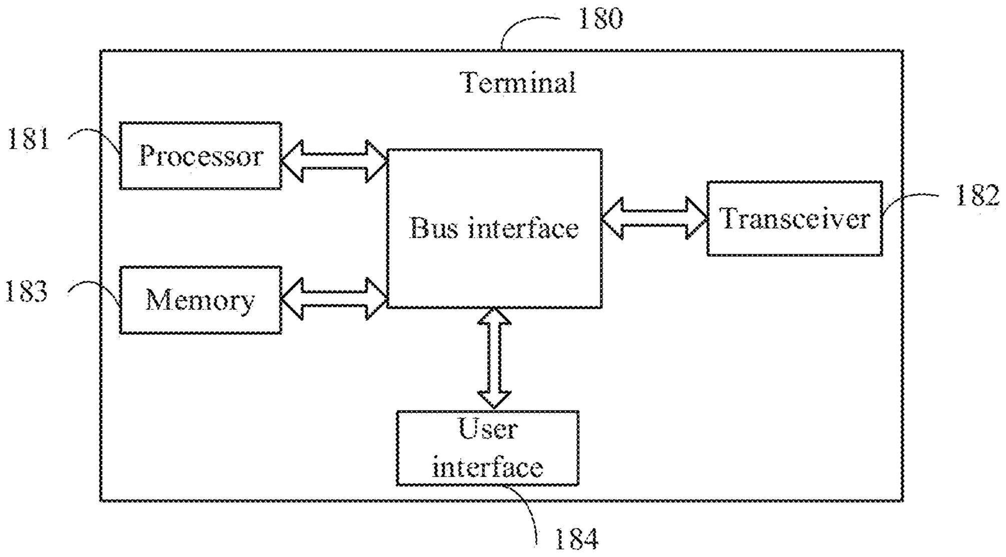
FIG. 18 shows a structure diagram of a terminal according to some embodiments of the present disclosure.

As shown in FIG. 18, some embodiments of the present disclosure also provide a terminal 180 including a processor 181, a transceiver 182, a memory 183, and programs stored on the memory 183 and executable on the processor 181, wherein, the transceiver 182 is connected to the processor 181 and the memory 183 through a bus interface, wherein the processor 181 is configured to read a program in the memory and perform the following processes: receiving a random-access success response message, sent by a network device, of a two-step random access through the transceiver 182; wherein, the random-access success response message includes indication information for indicating whether a signaling radio bearer (SRB) is carried.

It should be noted that in FIG. 18, a bus architecture may include any number of interconnected buses and bridges. Specifically, various circuits such as one or more processors represented by the processor 181 and a memory represented by the memory 183 are linked together. The bus architecture may also link together various other circuits, such as peripherals, voltage regulators, and power management circuits, all of which are well known in the art and thus will not be described further herein. The bus interface provides an interface. The transceiver 182 may be a plurality of elements, i.e., including a transmitter and a receiving, for providing a unit for communicating with various other devices over a transmission medium. A user interface 184 of a different transmitting end may also be an interface capable of externally or internally interfacing desired devices, including, but not limited to, keypads, displays, speakers, microphones, joysticks, and the like. The processor 181 is responsible for managing the bus architecture and general processing, and the memory 183 may store data used by the processor 181 when performing operations.

Optionally, when random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when the random-access success response messages for different terminals are not allowed to be multiplexed, the random-access success response includes a Medium Access Control Random Access Response sub-Protocol-Data-Unit (MAC RAR subPDU), the indication information is located in the MAC subheader of the MAC RAR subPDU, the indication information is configured to indicate whether there is an SRB subPDU, wherein w % ben the indication information indicates that there is a SRB subPDU, the random-access success response message further includes the SRB subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU or the indication information is located in the payload of the MAC RAR subPDU, wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or the payload portion of the MAC RAR subPDU includes a first length indication field; wherein the first length indication field is configured to indicate the length of the MAC RAR subPDU or the length of the SRB in the MAC RAR subPDU.

Further, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, the indication information is configured to indicate whether there is an SRB subPDU. When the indication information indicates that there is the SRB subPDU, the random-access success response further includes the SRB subPDU.

Further, when the indication information indicates that there is the SRB subPDU, the MAC subheader of the SRB subPDU further includes a third length indication field; wherein the third length indication field is configured to indicate the length of the SRB subPDU.

In particular, when the MAC RAR subPDU and the SRB subPDU use the same MAC subheader, the MAC subheader includes at least a part or all of the following fields; an extended field (E field) for indicating whether there are other MAC headers, a T field for indicating a random access preamble identifier or a fallback indication included in the MAC subheader, and random access preamble identifier information; and/or when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating the logical channel to which the SRB belongs, an L field for indicating the length of the SRB subPDU, an F2 field for indicating the length of the L field, and a reserved bit field.

Specifically, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message; when the message A includes an RRC recovery request message, the SRB is an RRC setup message, an RRC resume message, an RRC release message, an RRC release message with suspend configuration, or an RRC reject message.

Some embodiments of the present disclosure also provide a readable storage medium having stored thereon a program, wherein when the program is executed by a processor, the processor implements steps of an information receiving method applied to a terminal.

Figure 19:
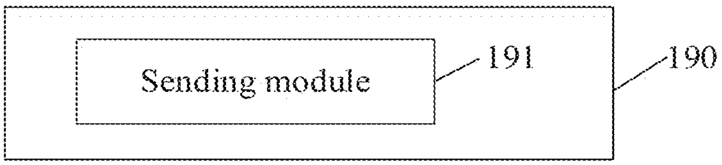
FIG. 19 shows a block diagram of a network device according to some embodiments of the present disclosure.

As shown in FIG. 19, some embodiments of the present disclosure provide a network device 190. The network device includes a sending module 191.

The sending module 191 is configured for sending, to a terminal, a random-access success response message of a two-step random access; wherein, random-access success response message includes indication information for indicating whether a signaling radio bearer (SRB) is carried.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, and the indication information is configured to indicate whether there is the SRB subPDU; wherein, when the indication information indicates that there is the SRB subPDU, the random-access success response message further includes the SRB subPDU.

Optionally, when the random-access success response messages for different terminals are allowed to be multiplexed, the random-access success response message includes random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or a payload portion of the MAC RAR subPDU includes a first length indication field; wherein the first length indication field is configured to indicate the length of the MAC RAR subPDU or the length of the SRB in the MAC RAR subPDU.

Further, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), and the indication information is located in the MAC subheader of the MAC RAR subPDU, the indication information is configured to indicate whether there is an SRB subPDU; wherein, when the indication information indicates that there is an SRB subPDU, the random-access success response further includes the SRB subPDU.

Further, when the indication information indicates that there is an SRB subPDU, the MAC subheader of the SRB subPDU further includes a third length indication field; wherein the third length indication field is configured to indicate the length of the SRB subPDU.

In particular, when the MAC RAR subPDU and the SRB subPDU use the same MAC subheader, the MAC subheader includes at least a part or all of the following fields: an extended field (E field) for indicating whether there are other MAC headers, a T field for indicating that a random access preamble identifier or a fallback indication included in the MAC subheader, and random-access preamble identifier information; and/or when the MAC RAR subPDU and the SRB subPDU use MAC subheaders having different formats, the MAC subheader of the MAC RAR subPDU includes a part or all of the following fields: an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating the logical channel to which the SRB belongs, a length indication field (L field) for the length of the SRB subPDU, an F2 field for indicating the length of the L field, and a reserved bit field.

Specifically, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message; when the message A includes an RRC recovery request message, the SRB is an RRC setup message, an RRC resume message, an RRC release message, an RRC release message with suspend configuration, or an RRC reject message.

It should be noted that this embodiment of the network device corresponds to the network device in the above method embodiment in a one-to-one manner, and all implementations in the above method embodiments are applicable to the embodiment of the network device, and the same technical effects can be achieved.

Figure 20:
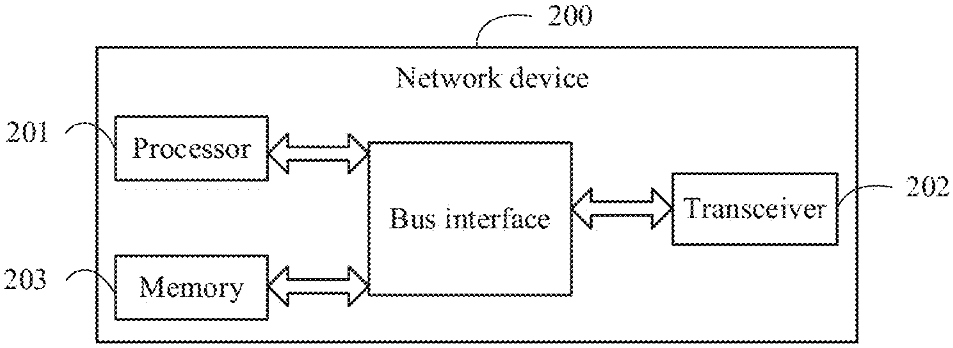
FIG. 20 shows a block diagram of a network device according to some embodiments of the present disclosure.

As shown in FIG. 20, some embodiments of the present disclosure also provide a network device 200. The network device 200 includes a processor 201, a transceiver 202, a memory 203, and programs stored on the memory 203 and executable on the processor 201; wherein the transceiver 202 is connected with the processor 201 and the memory 203 through a bus interface, the processor 201 is configured to read the program in the memory and execute the following processes: sending, to a terminal through the transceiver 202, a random-access success response message of a two-step random access; wherein, random-access success response message includes indication information for indicating whether a signaling radio bearer (SRB) is carried.

It should be noted that in FIG. 20, a bus architecture may include any number of interconnected buses and bridges. Specifically, various circuits such as one or more processors represented by the processor 201 and a memory represented by the memory 203 are linked together. The bus architecture can also link various other circuits such as peripherals, voltage regulators, power management circuits, etc., which are all known in the art, and therefore, will not be further described herein. A bus interface provides an interface. The transceiver 202 may be a plurality of elements, including a transmitter and a receiver, and provide a unit for communicating with various other devices on the transmission medium. The processor 201 is responsible for managing the bus architecture and general processing, and the memory 203 can store data used by the processor 201 when performing operations.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Optionally, when the random-access success response messages for different terminals are not allowed to be multiplexed, the random-access success response message includes a Medium Access Control Random Access Response sub-Protocol Data Unit (MAC RAR subPDU), the indication information is located in the MAC subheader of the MAC RAR subPDU, and the indication information is configured to indicate whether there is the SRB subPDU; wherein, when the indication information indicates that there is the SRB subPDU, the random-access success response message further includes the SRB subPDU.

Optionally, when the random-access success response messages for different terminals are allowed to be multiplexed, the random-access success response message includes random-access success responses of one or more terminals. For each terminal, the random-access success response includes a Medium Access Control Random Access Response sub-Protocol-Data-Unit (MAC RAR subPDU), the indication information is located in the MAC subheader of the MAC RAR subPDU, or, the indication information is located in a payload of the MAC RAR subPDU; wherein, when the indication information indicates that there is an SRB, the SRB is included in the payload of the MAC RAR subPDU.

Further, when the indication information is located in the MAC subheader of the MAC RAR subPDU, the MAC subheader of the MAC RAR subPDU includes a first length indication field, or a payload portion of the MAC RAR subPDU includes a first length indication field; wherein the first length indication field is configured to indicate the length of the MAC RAR subPDU or the length of the SRB in the MAC RAR subPDU.

Further, when the indication information is located in the payload of the MAC RAR subPDU, the payload of the MAC RAR subPDU further includes a second length indication field; wherein the second length indication field is configured to indicate the length of the MAC RAR subPDU or the length of the SRB in the MAC RAR subPDU.

Optionally, when the random-access success response messages for different terminals are allowed to be multiplexed, the random-access success response message includes one or more random-access success responses of one or more terminals. For each terminal, the random-access success response includes a Medium Access Control Random Access Response sub-Protocol-Data-Unit (MAC RAR subPDU), and the indication information is located in the MAC subheader of the MAC RAR subPDU, the indication information is configured to indicate whether there is an SRB subPDU; wherein, when the indication information indicates that there is an SRB subPDU, the random-access success response further includes an SRB subPDU.

Further, when the indication information indicates that there is an SRB subPDU, the MAC subheader of the SRB subPDU further includes a third length indication field; wherein the third length indication field is configured to indicate the length of the SRB subPDU.

In particular, when the MAC RAR subPDU and the SRB subPDU use the same MAC subheader, the MAC subheader includes at least a part or all of the following fields: an extended field (E field) for indicating whether there are other MAC headers, a T field for indicating a random access preamble identifier or a fallback indication included in the MAC subheader, and random-access preamble identifier information; and/or when the MAC RAR subPDU and the SRB subPDU use MAC subheaders having different formats, the MAC subheader of the MAC RAR subPDU includes a part or all of the following fields; an extended field (E field) for indicating whether there are other MAC headers, a T field for indicating a random access preamble identifier or a fallback indication included in the MAC subheader, and random-access preamble identifier information; the MAC subheader of the SRB subPDU includes part or all of the following fields: an extended field (E field) for indicating whether there are other MAC headers, a logical channel ID (LCID) field for indicating the logical channel to which the SRB belongs, a length indication field (L field) for the length of the SRB subPDU, an F2 field for indicating the length of the L field, and a reserved bit field.

Specifically, the SRB satisfies at least one of the following cases: when a message A includes a Radio Resource Control (RRC) connection setup message, the SRB is an RRC setup message or an RRC reject message; when the message A includes an RRC connection re-establishment message, the SRB is the RRC re-establishment message or the RRC reject message; when the message A includes an RRC recovery request message, the SRB is an RRC setup message, an RRC resume message, an RRC release message, an RRC release message with suspend configuration, or an RRC reject message.

The network device may be a Base Transceiver Station (BTS) in Global System of Mobile Communication (GSM) or Code Division Multiple Access (CDMA), or may be a base station (NodeB, abbreviated as NB) in Wideband Code Division Multiple Access (abbreviated as WCDMA), or an Evolved Node B (abbreviated as eNB or eNodeB) in LTE, or a relay station or an access point, or a base station ng-NB (Next Generation Node B) or a Central Unit (CU) or a Distributed Unit (DU) in a future 5G network, which are not limited.

Some embodiments of the present disclosure also provide a readable storage medium having stored thereon a program, wherein when the program is executed by a processor, the processor implements the steps of an information sending method applied to a network device.

Those of ordinary skill in the art will appreciate that units and algorithm steps of various examples described in connection with the embodiments disclosed herein can be implemented in electronic hardware, or a combination of computer software and electronic hardware. Whether these functions are executed by hardware or software depends on specific application and design constraint conditions of the technical solutions. One skilled in the art may implement the described functionality using different methods for each particular application, but such implementations should not be considered beyond the scope of the present disclosure.

It will be apparent to those skilled in the art that for convenience and conciseness of description, reference may be made to corresponding processes in the foregoing method embodiments to obtain a specific operation of the above described systems, devices and units, and thus is not repeated here.

In the embodiments provided herein, it should be understood that the disclosed apparatus and methods may be implemented in other ways. For example, the above-described embodiments of the apparatus are only illustrative, for example, division of units is only a logical functional division, and there may be another division manner in actual implementation. For example, multiple units or components may be combined or may be integrated into another system, or some features may be omitted or not performed. On the other hand, coupling or direct coupling or communication connection shown or discussed with respect to each other may be an indirect coupling or communication connection through interfaces, devices or units, and may be in t electrical, mechanical or other forms.

Units described as separate components may or may not be physically separated, components shown as units may or may not be physical units, that is, may be located in one place, or may be distributed over a plurality of network elements. Some or all of the elements may be selected according to actual needs to achieve the purpose of the solution of the present embodiment.

In addition, each functional unit in various embodiments of the present disclosure may be integrated in one processing unit, each unit may be separately physically present, or two or more units may be integrated in one unit.

The functions may be stored in a computer-readable storage medium if implemented in the form of software functional units and sold or used as stand-alone products. Based on such understanding, the part, contributing to the prior art, of the technical solutions, or the part of the technical solutions, or an essential part of the technical solutions may be embodied in the form of a software product, the computer software product is stored in a storage medium and includes instructions for causing a computer device (which may be a personal computer, a server, or a network device or the like) to perform all or part of the steps of the method described in various embodiments of the present disclosure. The storage medium includes various media capable of storing program codes, such as a USB disk, a portable hard disk, a ROM, a RAM, a magnetic disk, or an optical disk.

Those of ordinary skill in the art can understand that all or part of the processes in the method for implementing the above embodiments can be performed by controlling relevant hardware by a computer program, the program may be stored in a computer-readable storage medium, and the program, when executed, may implement processes of the embodiments of the methods described above. The storage medium may be a magnetic disk, an optical disk, a Read-Only Memory (ROM) or a Random Access Memory (RAM).

It will be appreciated that the embodiments described by some embodiments of the present disclosure may be implemented in hardware, software, firmware, middleware, microcode, or combinations thereof. When implemented in hardware, modules, units, sub-modules, sub-units, and the like may be implemented in one or more of Application Specific Integrated Circuits (ASIC), Digital Signal Processing (DSP), Digital Signal Processing Devices (DSP Device, DSPD) Programmable Logic Devices (PLD), Field-Programmable Gate Array (FPGA), general purpose processors, controllers, microcontrollers, microprocessors, other electronic units for performing the functions described herein, or combinations thereof.

When implemented in software, the techniques described in some embodiments of the present disclosure may be implemented by modules (e.g., procedures, functions, etc.) that perform the functions described in some embodiments of the present disclosure. Software codes may be stored in a memory and executed by a processor, the memory may be implemented in the processor or external to the processor.

Accordingly, the objectives of the present disclosure may also be achieved by running a program or a set of programs on any computing device. The computing device may be a well-known general purpose device. Accordingly, the objectives of the present disclosure may also be achieved by merely providing a program product containing program codes used to implement the methods or apparatuses. That is, such a program product also constitutes the present disclosure, and it is obvious that a storage medium for storing such a program product also constitutes the present disclosure. Obviously, the storage medium may be any known storage medium or any storage medium developed in the future. It should also be noted that in the apparatuses and methods of the present disclosure, it will be apparent that components or steps may be disassembled and/or recombined. Such disassembly and/or recombination should be considered to be equivalent to the present disclosure. Also, the steps for executing the series of processes described above may be executed in a chronological order naturally in the order described, but it is not always necessary to be executed in the chronological order. Certain steps may be performed in parallel or independently of each other.

The foregoing describe optional embodiments of the present disclosure, and it should be noted that for those of ordinary skill in the art, a number of modifications and embellishments may be made without departing from the principles set forth in the present disclosure. Such modifications and embellishments are also within the protection scope of the present disclosure.

What is claimed is:

1. An information receiving method applied to a terminal, comprising:

receiving a random-access success response message, sent by a network device, of a two-step random access; wherein, the random-access success response message comprises indication information for indicating whether a Signaling Radio Bearer (SRB) is carried in the random-access success response message;

wherein, when random-access success responses for different terminals are not allowed to be multiplexed, the random-access success response message comprises a Medium Access Control Random Access Response sub-Protocol-Data-Unit (MAC RAR subPDU), the indication information is located in a MAC subheader of the MAC RAR subPDU; wherein, when the indication information indicates that there is an SRB, the SRB is comprised in a payload of the MAC RAR subPDU, wherein the MAC subheader of the MAC RAR subPDU comprises a first length indication field; wherein the first length indication field is configured to indicate a length of the MAC RAR subPDU or a length of the SRB in the MAC RAR subPDU;

or, wherein, when random-access success responses for different terminals are not allowed to be multiplexed, the random-access success response message comprises a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU, wherein when the indication information indicates that there is the SRB subPDU, the random-access success response message further comprises the SRB subPDU, wherein the MAC subheader of the SRB subPDU further comprises a third length indication field; wherein the third length indication field is configured to indicate a length of the SRB subPDU;

or, wherein, when random-access success responses for different terminals are allowed to be multiplexed, the random-access success response message comprises one or more random-access success responses for one or more terminals, the random-access success response for each terminal comprises a Medium Access Control Random Access Response sub-Protocol-Data-Unit (MAC RAR subPDU), the indication information is located in a MAC subheader of the MAC RAR subPDU, wherein, when the indication information indicates that there is an SRB, the SRB is comprised in a payload of the MAC RAR subPDU, when the MAC RAR subPDU and the SRB subPDU use a same MAC subheader, the MAC subheader comprises at least a part or all of the following fields:

an extended field (E field) for indicating whether there are other MAC headers, a T field for indicating a random access preamble identifier or a fallback indication comprised in the MAC subheader, and random access preamble identifier information.

2. The information receiving method according to claim 1, wherein, when the MAC RAR subPDU and the SRB subPDU use MAC subheaders having different formats, the MAC subheader of the MAC RAR subPDU comprises a part or all of the following fields:

an extended field (E field) for indicating whether there are other MAC headers, a T field for indicating a random access preamble identifier or a fallback indication comprised in the MAC subheader, and random-access preamble identifier information;

the MAC subheader of the SRB subPDU comprises part or all of the following fields:

an extended field (E field) for indicating whether there are other MAC headers, a logical channel ID (LCID) field for indicating a logical channel to which the SRB belongs, a L field for indicating a length of the SRB subPDU, an F2 field for indicating a length of the L field, and a reserved bit field.

3. A terminal, comprising a memory, a processor and a program stored on the memory and executable on the processor, wherein when the processor executes the program, the processor implements steps of method according to claim 1.

4. The method according to claim 1, wherein, when random-access success responses for different terminals are allowed to be multiplexed, the random-access success response message comprises the one or more random-access success responses for one or more terminals, the random-access success response for each terminal comprises the MAC RAR subPDU, and the indication information is located in the MAC subheader of the MAC RAR subPDU, the MAC subheader of the MAC RAR subPDU comprises a first length indication field, wherein the first length indication field is configured to indicate a length of the MAC RAR subPDU or a length of the SRB in the MAC RAR subPDU.

5. An information sending method applied to a network device, comprising:

sending, to a terminal, a random-access success response message of a two-step random access; wherein, the random-access success response message comprises indication information for indicating whether a Signaling Radio Bearer (SRB) is carried in the random-access success response message, wherein, when random-access success responses for different terminals are not allowed to be multiplexed, the random-access success response message comprises a Medium Access Control Random Access Response sub-Protocol-Data-Unit (MAC RAR subPDU), the indication information is located in a MAC subheader of the MAC RAR subPDU, wherein, when the indication information indicates that there is an SRB, the SRB is comprised in a payload of the MAC RAR subPDU, wherein the MAC subheader of the MAC RAR subPDU comprises a first length indication field; wherein the first length indication field is configured to indicate a length of the MAC RAR subPDU or a length of the SRB in the MAC RAR subPDU;

or, wherein, when random-access success responses for different terminals are not allowed to be multiplexed, the random-access success response message comprises a Medium Access Control Random Access Response sub-Protocol-Data-Unit (MAC RAR subPDU), the indication information is located in a MAC subheader of the MAC RAR subPDU, the indication information is configured to indicate whether there is an SRB subPDU, wherein when the indication information indicates that there is the SRB subPDU, the random-access success response message further comprises the SRB subPDU, wherein the MAC subheader of the SRB subPDU further comprises a third length indication field; wherein the third length indication field is configured to indicate a length of the SRB subPDU;

or, wherein, when random-access success responses for different terminals are allowed to be multiplexed, the random-access success response message comprises one or more random-access success responses for one or more terminals, the random-access success response for each terminal comprises a Medium Access Control Random Access Response sub-Protocol-Data-Unit (MAC RAR subPDU), the indication information is located in a MAC subheader of the MAC RAR subPDU, wherein, when the indication information indicates that there is an SRB, the SRB is comprised in a payload of the MAC RAR subPDU;

when the MAC RAR subPDU and the SRB subPDU use a same MAC subheader, the MAC subheader comprises at least a part or all of the following fields:

an extended field (E field) for indicating whether there are other MAC headers, a T field for indicating a random access preamble identifier or a fallback indication comprised in the MAC subheader, and random access preamble identifier information.

6. The information sending method according to claim 5, wherein, when the MAC RAR subPDU and the SRB subPDU use MAC subheaders having different formats, the MAC subheader of the MAC RAR subPDU comprises a part or all of the following fields:

an extended field (E field) for indicating whether there are other MAC headers, a T field for indicating a random access preamble identifier or a fallback indication comprised in the MAC subheader, and random-access preamble identifier information;

the MAC subheader of the SRB subPDU comprises part or all of the following fields:

an extended field (E field) for indicating whether there are other MAC headers, a logical channel ID (LCID) field for indicating a logical channel to which the SRB belongs, a L field for indicating a length of the SRB subPDU, an F2 field for indicating a length of the L field, and a reserved bit field.

7. A network device, comprising a memory, a processor and a program stored on the memory and executable on the processor, wherein when the processor executes the program, the processor implements steps of the method according to claim 5.

8. The method according to claim 5, wherein, when random-access success responses for different terminals are allowed to be multiplexed, the random-access success response message comprises the one or more random-access success responses for one or more terminals, the random-access success response for each terminal comprises the MAC RAR subPDU, and the indication information is located in the MAC subheader of the MAC RAR subPDU, the MAC subheader of the MAC RAR subPDU comprises a first length indication field, wherein the first length indication field is configured to indicate a length of the MAC RAR subPDU or a length of the SRB in the MAC RAR subPDU.

* * * * *